United States Patent [19]
Pickles

[11] 4,294,488
[45] Oct. 13, 1981

[54] RECLINER AND INERTIA LATCH

[75] Inventor: Joseph Pickles, Birmingham, Mich.

[73] Assignee: Ferro Manufacturing Corporation, Southfield, Mich.

[21] Appl. No.: 96,883

[22] Filed: Nov. 23, 1979

[51] Int. Cl.³ .............................................. A47C 1/026
[52] U.S. Cl. ..................................... 297/367; 297/379
[58] Field of Search ....................... 297/379, 366–369, 297/216, 355; 16/146

[56] References Cited

U.S. PATENT DOCUMENTS

| | | | |
|---|---|---|---|
| 2,873,794 | 2/1959 | Leslie et al. | 297/379 |
| 3,931,996 | 1/1976 | Yoshimura | 297/379 X |
| 4,103,964 | 8/1978 | Klingelhöfer et al. | 297/379 X |
| 4,146,267 | 3/1979 | Mori et al. | 297/379 X |
| 4,165,128 | 8/1979 | Strowick et al. | 297/379 X |

FOREIGN PATENT DOCUMENTS

| | | | |
|---|---|---|---|
| 2514819 | 10/1976 | Fed. Rep. of Germany | 297/379 |
| 2806771 | 8/1979 | Fed. Rep. of Germany | 297/379 |

*Primary Examiner*—William E. Lyddane
*Attorney, Agent, or Firm*—Whittemore, Hulbert & Belknap

[57] ABSTRACT

A vehicle seat including a recliner and inertia latch, in which the inertia latch is normally in latching position but upon initial limited forward movement of a seat portion it is permitted to move to release position. In the event of deceleration, the latch remains in latching position and prevents forward movement of the seat. The seat frame is of relatively light construction and means are provided which avoid interference with structure interposed on the axis of the pivot connection of the seat back to the seat, insuring simultaneous identical latch actuation at opposite sides of the seat.

13 Claims, 11 Drawing Figures

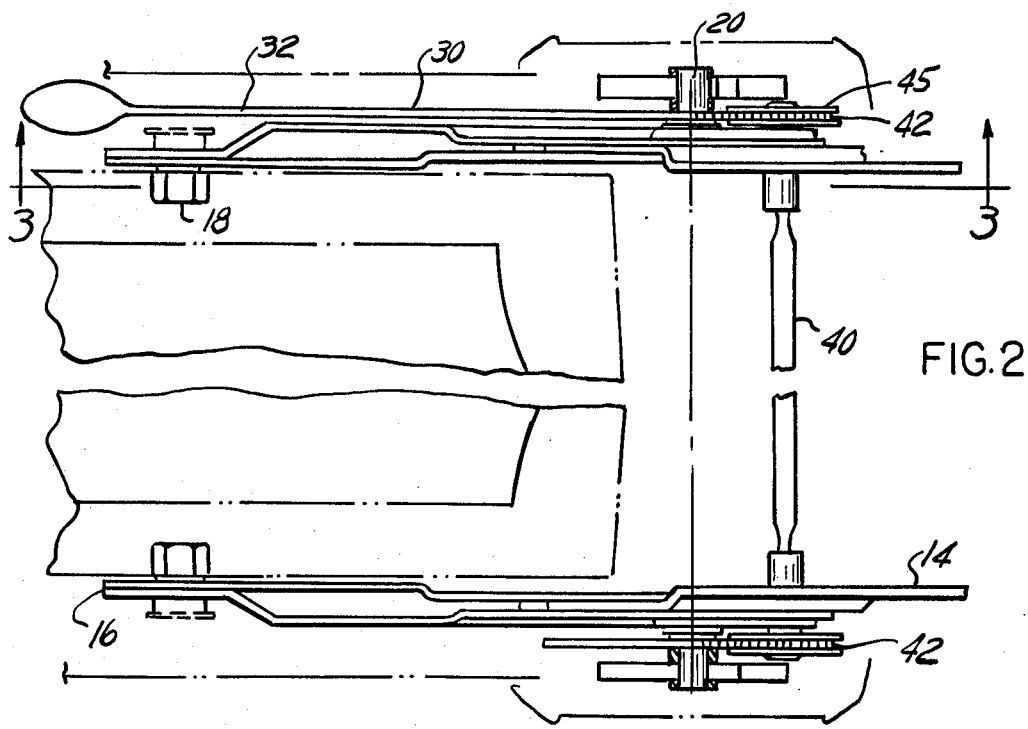
FIG. 2
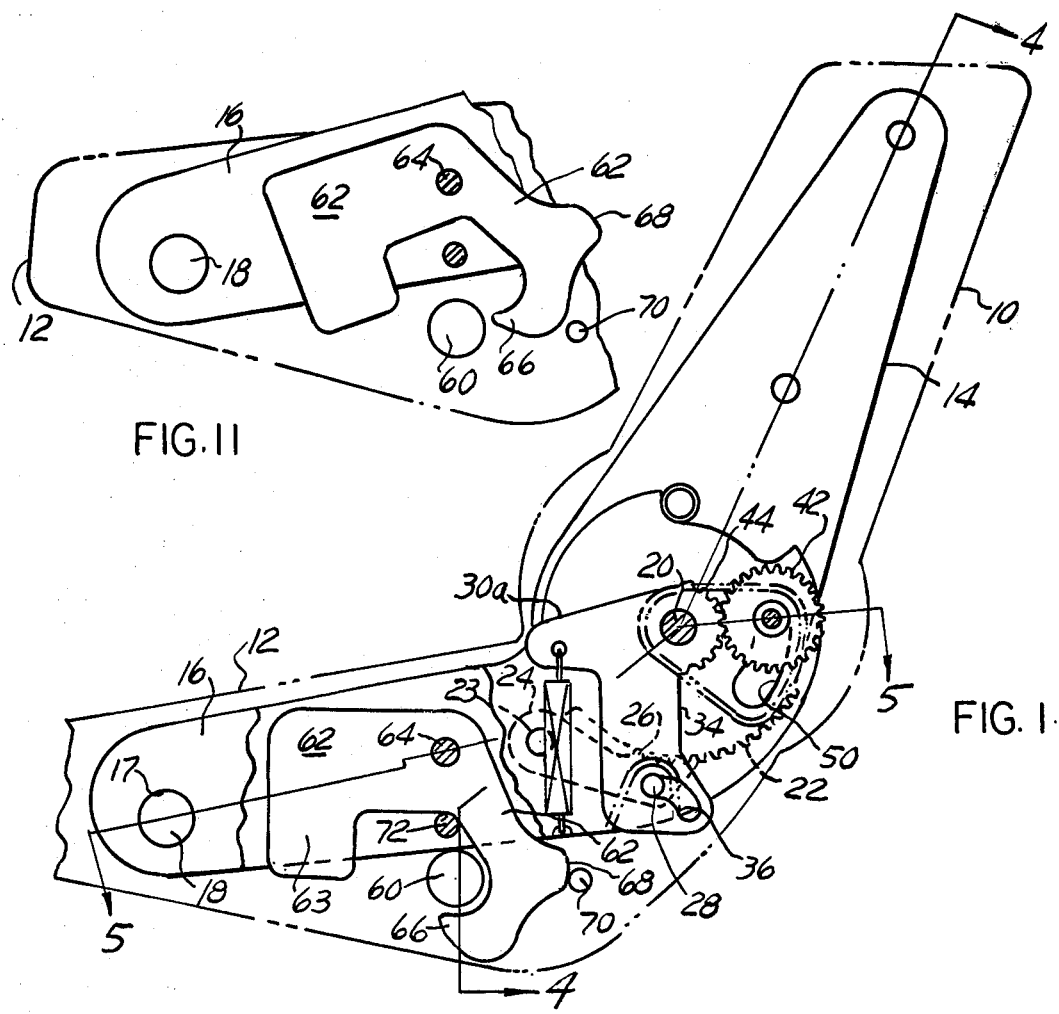
FIG. 11
FIG. 1

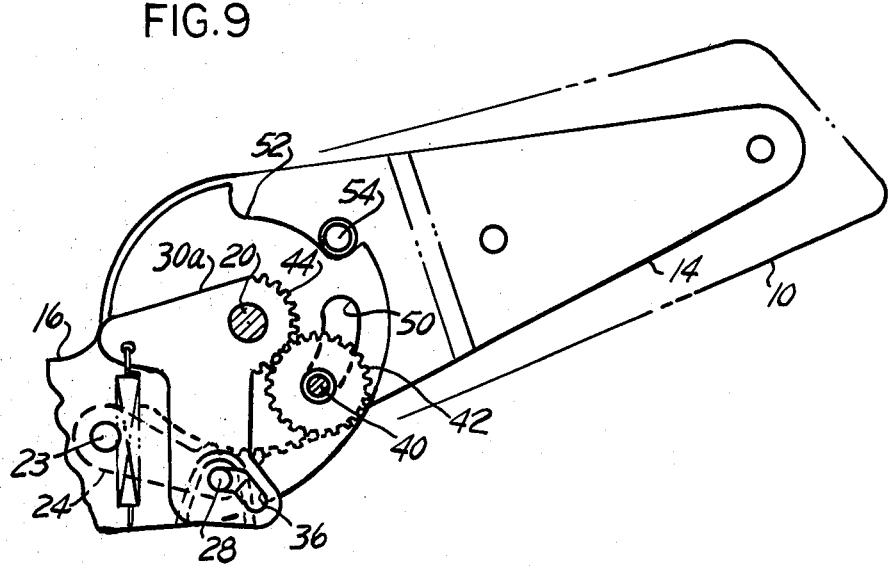
FIG. 9
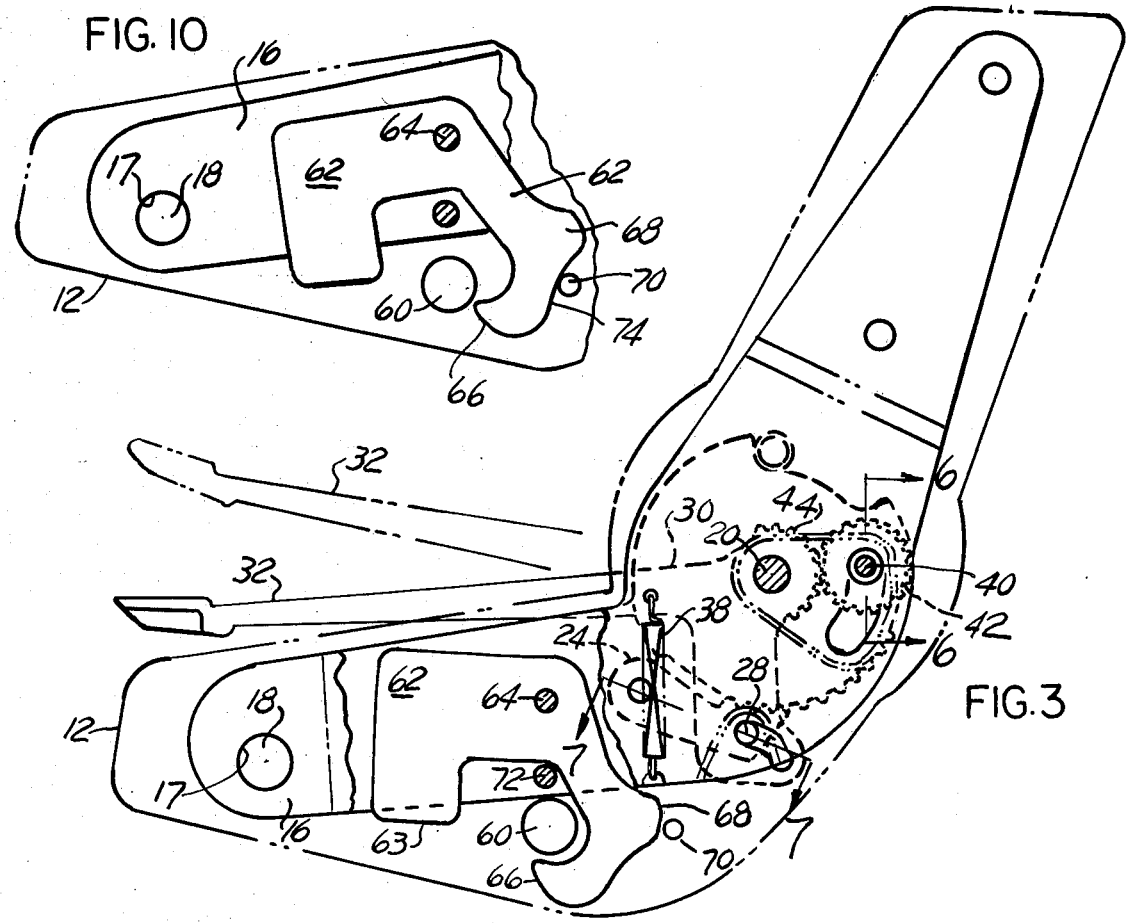
FIG. 10
FIG. 3

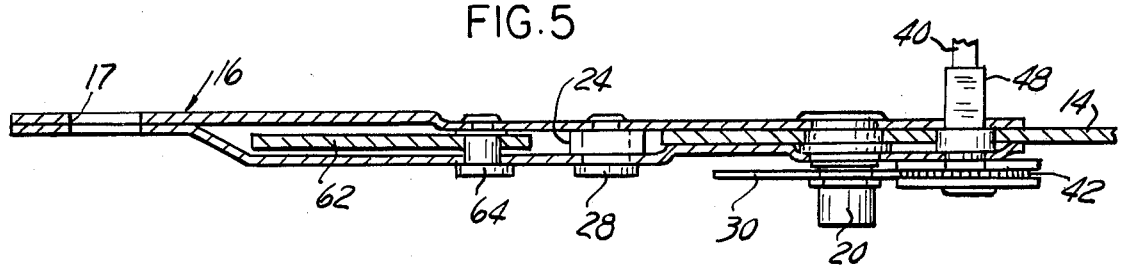
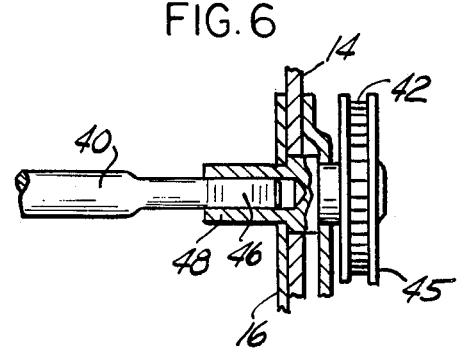
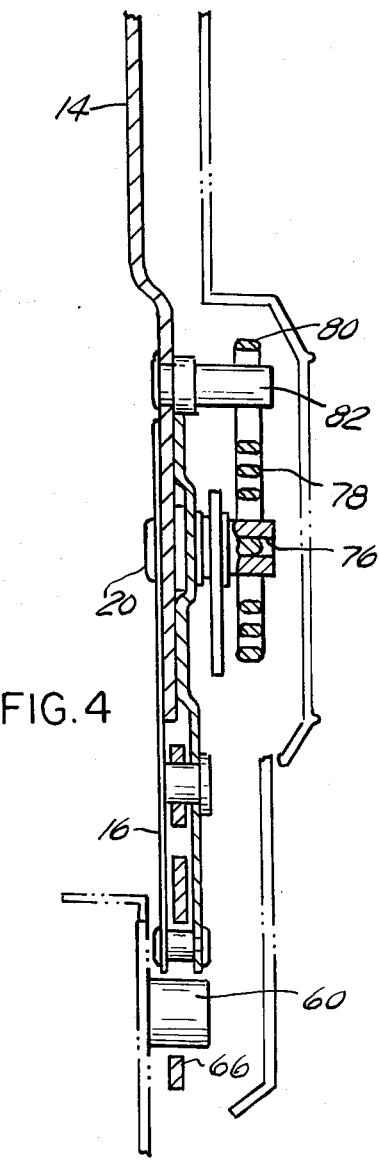
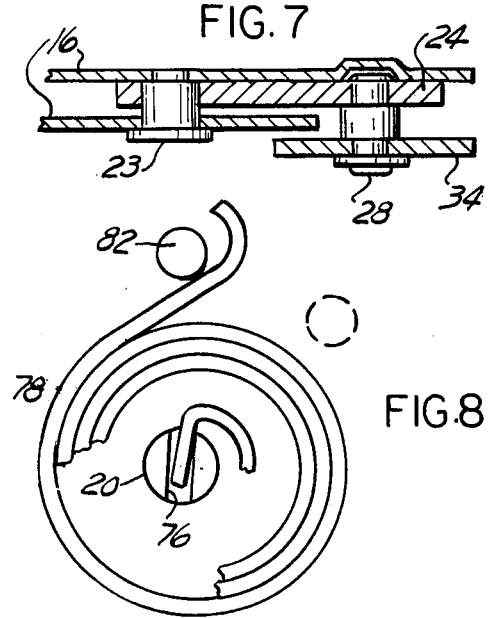

RECLINER AND INERTIA LATCH

BRIEF SUMMARY OF THE INVENTION

The present invention relates to vehicle seat constructions and more particularly to a seat including a reclining seat back manually movable to a plurality of intermediate reclining positions and positively locked in adjusted reclining position.

Reduction of overall weight is a prime consideration in present day automobiles, and accordingly the seat and its support means is to be as light as possible. It is therefore necessary to insure simultaneous locking of both sides of the reclinable back in adjusted position. Herein a relatively light torsion bar provided with pinions at opposite ends extend between the opposite sides of the seat construction at a point spaced from the pivot axis of the seat back. A locking dog is provided which is spring biased into positively locking engagement with the reclining back and a manually operable lever is provided at the outer side of the seat which includes cam means for camming the locking dog to its release position. The manual lever includes a toothed sector which engages a pinion at one end of the torsion bar and the pinion at the opposite end of the torsion bar engages a similar toothed sector on a pivoted lever having camming means engaging a locking dog identical with the locking dog at the inner side of the seat construction.

With this arrangement relatively light parts can be used and still provide adequate strength for all anticipated stresses.

The seat construction including the seat proper and the reclining seat back are movable as a unit about a fixed pivot mounting to permit the entire seat construction to be swung generally upwardly and forwardly to provide access to the rear seat.

Means are provided to positively prevent forward and upward swinging of the seat under inertial forces such as developed by rapid deceleration. Specifically this latch mechanism includes a pivoted latch member having an abutment portion engageable with a rigid fixed abutment when the latch lever is in latching position. The latching lever is constructed and arranged such that gravitational forces tend to swing the latch lever toward release position. Camming means are provided engageable with the latch lever when the seat is in normal (as contrasted with forwardly moved access) position to cam the latch lever into latching position. However, at this time the portion of the latch lever engageable with the fixed abutment is slightly spaced therefrom to provide limited lost motion during initial movement of the seat toward its access position. Thus when manual force is applied gradually to the seat construction, the latch lever moves by gravity to the release position before its abutment portion engages the fixed abutment. On the other hand in the event of suddenly applied substantial inertial forces such as developed by rapid deceleration, the latch lever does not have time to move out of its latching position.

Thus in general terms the latch lever is normally held in latching position but is permitted to move to release position during limited initial forward movement of the seat construction if such initial movement is gradual.

BRIEF DESCRIPTION OF THE DRAWINGS

FIG. 1 is an elevational view of a vehicle seat construction with parts broken away and sectioned.

FIG. 2 is a plan view of the seat construction.

FIG. 3 is a section on the line 3—3, FIG. 2.

FIG. 4 is a fragmentary sectional view on the line 4—4, FIG. 1.

FIG. 5 is a sectional view on the line 5—5, FIG. 1.

FIG. 6 is a fragmentary sectional view on the line 6—6, FIG. 3.

FIG. 7 is a fragmentary sectional view on the line 7—7, FIG. 3.

FIG. 8 is a detailed view of the counterbalance spring construction.

FIG. 9 is a fragmentary view similar to FIG. 3 showing the seat back in reclining position.

FIG. 10 is a fragmentary view of parts shown in FIG. 1 with the latch in an intermediate position.

FIG. 11 is a view similar to FIG. 10 showing the latch in fully released position.

DETAILED DESCRIPTION

The seat construction as best illustrated in FIG. 1 comprises a seat back 10 and a seat cushion 12 each supported by suitable lightweight frames which in turn are connected respectively to recliner brackets 14 and seat brackets 16.

It will be understood that FIGS. 1 and 3 illustrate constructions at the left hand side and the right hand side of an individual seat. However, since these constructions are very similar and both contain identical parts, the parts will be given the same reference characters in FIGS. 1 and 3.

The seat construction as a unit is adapted to be swung upwardly and forwardly by the occupant of a rear seat so as to afford access into and out of the rear seat. For this purpose seat brackets 16 are provided with openings 17 which receive pivot pins 18 which may be considered as fixed in the following description. As a matter of fact the pivot pins 18 may be provided in longitudinal slides which permit the front seat construction to be moved forwardly and rearwardly into different positions of adjustment. Recliner brackets 14 are pivoted to seat brackets 16 by individual pivot pins 20. The pivot mountings provided by the pins 20 permit the seat back to be swung between the normal upstanding position illustrated in FIGS. 1 and 3 and a rearwardly inclined reclining position which for example may represent a tilting of the seat back at an angle of approximately 45° as seen in FIG. 9. With the present construction the seat back is moved manually between normal position and any desired reclining position. Such adjustment is normally accomplished by the occupant of the front seat simply applying pressure to the seat back by leaning rearwardly while the seat back assembly is in unlatched position. With the seat back assembly in the desired reclining position, seat back locking means is engageable which positively retains the seat back in reclining position, even against relatively strong forces such as may be applied as a result of collision or sudden deceleration.

Recliner brackets 14 are provided with locking teeth 22. Pivoted to the seat brackets 16 as indicated at 23, are locking dogs 24 provided as indicated at 26 with a plurality of arcuate locking teeth engageable with a like plurality of teeth 22 provided on the recliner brackets. Dogs 24 are provided adjacent the end having teeth 26 with pins 28. Manual control means 30 is provided at the right hand or outer side of the seat construction as best illustrated in FIG. 3 and includes a forwardly projecting manipulating arm 32 and a dog actuating arm 34 provided with camming slot 36 into which the pin 28 extends. The manipulating arm 32 is connected by tension spring 38 to the seat brackets 16, thus biasing the manual control means 30 in a counterclockwise direction to the full line position illustrated in FIG. 3. This in turn, through the camming action of the pin 28 and the cam slot 36, urges the dog 24 to the locking position as illustrated. In addition it will be noted that the cam slot 36 includes an inclined camming portion and a second portion, which receives the pins 28 in the locked position illustrated which extends perpendicular to a line joining the pins 20 and 28. Thus the cam slot 36 positively locks the pin against movement from the illustrated locking position.

As previously mentioned, the present invention has one of its primary aims the reduction of weight so that the parts, including the seat back seat proper (not illustrated) would be capable of distortion unless substantial adequate locking forces were provided at each side of the seat.

The seat back recliner structure disclosed herein is applied to a motor vehicle in which interfering structure is located in position to be intersected by the pivot axis of the seat back as determined by pivot pins 20. Accordingly it is impossible to interconnect lock release mechanism by a torsion bar extending along the pivot axis 39 as seen in a broken line in FIG. 2. Instead, a torsion bar must be located in a position spaced from this axis, and moreover, it must be movable with the seat back in an arc about pivot axis 39, to avoid interference with part of the seat back.

In order to accomplish the foregoing, the seat construction includes a lock release torsion bar or shaft 40 having pinions 42 fixed to opposite ends thereof. Manual control means 30 is provided with an arcuate series of teeth 44 constituting pinion portions which mesh with the teeth of adjacent pinions 42. As best seen in FIG. 6, pinions 42 are preferably provided with shroud disks 45 which insure meshed engagement of pinions 42 with teeth 44. These disks are omitted for clarity in other Figures. Torsion bar 40, as best seen in FIG. 6, is provided with a square end sections 46 which fit within sleeves 48 carried by brackets 14 and which are slidable in guide means comprising arcuate slots 50 provided in the seat brackets 16. Accordingly as the manually movable arm 32 is raised from the full line position illustrated in FIG. 3 to the dotted line position thereof, the toothed sector having the arcuate series of teeth 44 is moved clockwise which in turn results in counterclockwise rotation of the pinions 42 which operates control member 30a at the inner side of the seat construction. Movement of the torsion bar 40 from the position illustrated in FIG. 3 to the position illustrated in FIG. 9 is accomplished by movement of the recliner brackets 14 to the fully reclined position of FIG. 9. The seat brackets 16 as best illustrated in FIG. 9 are provided with recessed portions 52 and the recliner brackets 14 are provided with stops 54 which engage ends of the recesses 52 to limit forward and rearward pivoting movement of the seat back between erect and reclining positions.

Comparing FIGS. 1 and 3 it will be observed that control means 30a is provided which is similar to the control means 30 illustrated in FIG. 3 except that the manipulating handle 32 is omitted. However, through the medium of the sector having teeth 22, the adjacent pinion 42, the torsion bar 40, the pinion 42 at the other end of the bar and a tooth portion 44a, movement of the control means 30a is identical with movement of the correspondingly shaped portions of the control means 30. Moreover this results in positive engagement of the locking dogs at both sides of the seat construction with the tooth sectors 22 of the recliner brackets so that the seat back is positively locked in adjusted position at both sides thereof.

As previously indicated, means are also provided so that the entire seat construction including the seat back 10 and the seat 12 may be swung forwardly and upwardly by the occupant of the rear seat of a vehicle, to provide access to the back seat. It will be understood that the seat back is positively locked against movement relative to the seat proper by the control means 30 so that pressure applied to the top of the seat back will swing the entire seat construction as a unit about the pivoted axis defined by the stationary pivot mounting pins 18.

It is desirable to prevent forward or forward and upward swinging of the seat construction as a result of the application of inertial forces such as are developed by rapid deceleration of the vehicle, or by collision. Means for accomplishing this comprise fixed latch pins 60 at opposite sides of the structure supporting the seat and associated with the pins 60 are latch levers 62 pivoted as indicated at 64 to seat brackets 16. The latch lever 62 is shaped relative to its pivot mounting 64 so that inertial forces resulting from deceleration tend to swing the latch lever clockwise about its pivot mounting 64. For this purpose latch levers 62 include mass portions 63 well below and forward of pivot 64. Thus the design of the latch lever is such that gravitational forces tend to rotate the latch lever counterclockwise. The latch lever includes a hook or abutment portion 66 engageable under certain conditions with the latch pins 60. Latch levers 62 are also provided with camming projections 68 engageable with stationary camming pins 70 provided on the stationary mounting for the pivoted seat brackets 16.

With the parts in the position illustrated in FIGS. 1 and 2 it will be observed that pins 70 cooperate with the camming projections 68 to retain the abutment or hook portion 66 of the latch levers in position beneath the latch pins 60. This will be true irrespective of any intermediate reclining position in which the seat back 10 may be locked.

It will be observed in these figures that a limited clearance exists between the abutment portion 66 of the latch levers into latch pins which permit very limited movement of the seat construction forwardly and upwardly about pivot mountings 18. Initial upward movement of the seat construction, as for example to the position illustrated in FIG. 10 causes the projections 68 to move off pins 70 and thus to permit counterclockwise swinging of the latch levers 62 to the position illustrated in FIG. 10. Further slow movement of the seat construction in an upwardly and forward direction about pivot pins 18 permits the latch levers 62 to swing to full clearance position and to move past the latch pins 60 as seen in FIG. 11. At this time further movement of the seat construction forwardly to full access position may be carried out.

With the parts in the position illustrated in FIG. 1 for example, the latch levers 62 is positioned for engagement with the latch pins 60 if the seat construction is moved abruptly in a counterclockwise direction about pivot pins 18. Such abrupt movement of the seat construction will occur under collision conditions or under predetermined rapid deceleration. Under these conditions there is insufficient time for the latch levers 62 to move through the position illustrated in FIG. 10 to the position illustrated in FIG. 11 and accordingly the hook portion of the latch lever will engage the latch pins, positively retaining the entire seat construction from forward movement.

When the seat is moved from its full forward access position to the normal position illustrated in FIGS. 1 and 3, pins 72 limit the counterclockwise movement of the latch levers 62 such that as the seat moves into its normal position, pins 70 engage suitably inclined camming surfaces 74 on the latch levers to move them to the position illustrated in FIG. 3.

The primary pivot pins 20 are fixedly mounted in seat brackets 16 and recliner brackets 14 are pivoted through as is illustrated in FIG. 4.

In order to counterbalance the weight of the seat back when unlatched, the pivot pin 20 is slotted as indicated at 76 and receives one end of a coil spring 78, the other end 80 of which engages a spring stop pin 82 fixed in the recliner brackets 14. The spring is designed to apply increasing torque as the seat back is moved toward full reclining position so as to counterbalance the increasing gravitational torque on the seat back.

I claim:

1. A vehicle seat construction comprising a vehicle seat having seat brackets fixed to opposite lateral ends thereof, a reclining seat back having recliner brackets fixed to opposite sides at the lower end thereof, pivot means interconnecting the seat brackets and the adjacent recliner brackets, lock means for positively locking both recliner brackets simultaneously in selected positions relative to said seat brackets, said lock means comprising a movable lock member at each side of the seat construction, a rotatably mounted actuator cooperating with each of said lock members, a manually movable lever fixed to one of said actuators, and a drive connection between said actuators to insure identical simultaneous movement of said actuators at opposite sides of said seat construction, said drive connection comprising an elongated straight, rigid torsion bar extending between and mounted for rotation about its longitudinal axis relative to a first pair of like brackets at opposite sides of the seat construction, and means providing for movement of said bar relative to the other pair of like brackets in an arcuate path concentric with but displaced substantially from the transverse pivot axis determined by the location of the pivot means interconnecting the brackets at opposite side of said seat construction.

2. A seat construction as defined in claim 1, in which said actuators are pivotally carried by the pivot means interconnecting the seat and recliner brackets.

3. A seat construction as defined in claim 1 in which said actuators each have toothed sectors, and pinions fixed to opposite ends of said torsion bar in mesh with said sectors.

4. A seat construction as defined in claim 2, in which said torsion bar is mounted for rotation adjacent its ends in said recliner brackets.

5. A seat construction as defined in claim 4, in which the pivotally interconnected recliner and seat brackets have overlapped substantially flat and abutting plate portions, and said seat brackets have arcuate slots concentric with said transverse pivot axis along which said torsion bar is movable.

6. A seat construction as defined in claim 1, in which one of the brackets at each side of said seat construction is provided with an arcuate series of lock teeth, each of said movable lock members being pivoted at one end to the adjacent other bracket and having lock teeth at the other end movable into and out of locking engagement with the lock teeth on the adjacent one bracket.

7. A seat construction as defined in claim 6, in which said actuators and lock members are interconnected by pin and slot connections, in which the slot comprises an inclined camming portion shaped to move said lock members into and out of locking position upon movement of said actuator, and an elongated blocking portion perpendicular to a line joining the pivot axis of said actuator and the pin of said pin and slot connection positively blocking movement of said lock members out of locking position.

8. A reclining seat back bracket construction for a vehicle comprising a seat bracket, a recliner bracket, a pivot connection between said brackets, an arcuate series of locking teeth on one of said brackets, a toothed lock member movably mounted on the other for movement into and out of locking engagement with the locking teeth on said one member, an actuator pivotally mounted on said pivot connection, and a pin and slot connection between said lock member and said actuator, said slot including an inclined camming portion operable to move said lock member between locked and unlocked position upon movement of said actuator and a blocking portion extending perpendicular to the line joining the pivot axis of said actuator and the pin of said pin and slot connection which positively blocks said lock member against movement from locking position.

9. A bracket construction as defined in claim 8, in which said lock member is pivoted adjacent one end to said seat bracket, and the arcuate series of locking teeth are provided on said recliner bracket.

10. A bracket construction as defined in claim 9, which comprises an operating member extending from said actuator, and resilient means connecting said actuator to said seat bracket and urging said actuator and lock member into locking position, whereby said recliner bracket is positively locked to said seat bracket.

11. A vehicle seat construction comprising a vehicle seat having seat brackets fixed to opposite lateral ends thereof, a reclining seat back having recliner brackets fixed to opposite sides at the lower end thereof, pivot means interconnecting the seat brackets and the adjacent recliner brackets, lock means for positively locking both recliner brackets simultaneously in selected positions relative to said seat brackets, said lock means comprising an arcuate toothed portion on each recliner bracket concentric with the transverse pivot axis determined by the location of the pivot means interconnecting the brackets at opposite side of said seat construction and a correspondingly toothed elongated locking dog pivotally mounted adjacent one end thereof on each seat bracket for movement of its toothed portion into an out of locking engagement with the toothed portion of the adjacent recliner bracket, actuators pivotally mounted on said seat bracket, each having an actuating connection to the adjacent locking dog to effect positive movement of said dogs into and out of locking engagement with the toothed portions of said recliner brackets, a manual operator positively connected to one of said actuators, and means providing identical simultaneous movement of said actuators comprising toothed pinion portions on each of said actuators concentric with the pivot mountings thereof, arcuate slots in said seat brackets concentric with said transverse axis, an elongated straight, rigid torsion shaft extending between the brackets at opposite sides of said seat construction and parallel to said transverse axis, pinions fixed to end portions of said torsion bar in mesh with the pinion portions of said actuators, shaft journals in said recliner brackets supporting said torsion shaft for rotation about its longitudinal axis, said arcuate slots providing for angular adjustment of said seat back while maintaining the geared connection between said pinions and pinion portions.

12. A construction as defined in claim 11, in which the actuating connections between said locking dogs and said actuators comprise pin and slot connections in which the slots of said connections comprise locking portions extending radially of the axes of pivot mountings of said actuators, and camming portions extending at an angle with respect to lines radial of the axes of the pivot mountings of said actuators.

13. A vehicle seat construction comprising a vehicle seat having seat brackets fixed to opposite lateral ends thereof, a reclining seat back having recliner brackets fixed to opposite lateral ends thereof, pivot means interconnecting the seat brackets and the adjacent recliner brackets, lock means for locking both recliner brackets in selected positions relative to said seat brackets, said lock means comprising a movable lock member at each side of the seat construction, a rotatably mounted actuator cooperating with each of said lock members, a manually movable lever fixed to one of said actuators, and a drive connection between said actuators to insure identical movement of said actuators at opposite sides of said seat construction, said drive connection comprising an elongated torsion bar extending between the pivotally interconnected brackets at opposite sides of the seat construction, and means supporting said bar for rotation about its longitudinal axis located parallel to but displaced substantially from the transverse pivot axis determined by the location of the pivot means interconnecting the brackets at opposite sides of said seat construction, said actuators each having toothed sectors, said torsion bar having pinions fixed thereto adjacent opposite ends thereof and in mesh with said sectors.

* * * * *